US011104448B2

(12) United States Patent
Miner et al.

(10) Patent No.: US 11,104,448 B2
(45) Date of Patent: Aug. 31, 2021

(54) FLUID NOZZLE

(71) Applicant: Eaton Intelligent Power Limited, Dublin (IE)

(72) Inventors: Jason Miner, Orange, CA (US); Stephen E. Sipprell, Mission Viejo, CA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/419,285

(22) Filed: May 22, 2019

(65) Prior Publication Data
US 2019/0359473 A1  Nov. 28, 2019

Related U.S. Application Data

(60) Provisional application No. 62/675,990, filed on May 24, 2018.

(51) Int. Cl.
*B64D 39/06* (2006.01)
*B67D 7/00* (2010.01)
*B67D 7/32* (2010.01)
*B67D 7/42* (2010.01)
*B67D 7/04* (2010.01)

(52) U.S. Cl.
CPC ............ *B64D 39/06* (2013.01); *B67D 7/002* (2013.01); *B67D 7/04* (2013.01); *B67D 7/32* (2013.01); *B67D 7/42* (2013.01)

(58) Field of Classification Search
CPC ........ B64D 39/00; B64D 39/04; B64D 39/06; B67D 7/42–54; Y10S 285/92; Y10T 137/87949; H01F 3/04; H01F 3/46; H01H 13/186
See application file for complete search history.

(56) References Cited

U.S. PATENT DOCUMENTS

| 2,817,725 A * | 12/1957 | Rochfort | H01H 5/04 200/47 |
| 3,976,100 A * | 8/1976 | Souslin | B64D 39/06 137/614.03 |
| 4,438,793 A * | 3/1984 | Brown | B64D 39/06 141/346 |

(Continued)

OTHER PUBLICATIONS

Sensors and Materials, vol. 27, No. 4 (2015) 341-349; A Measurement Method for Ball Joint Spatial Rotation Angle; Hu Penghao, et al.

*Primary Examiner* — Andrew D StClair
(74) *Attorney, Agent, or Firm* — Fishman Stewart PLLC

(57) ABSTRACT

A fluid nozzle includes an inlet housing configured for connection with a tanker aircraft boom, an outlet housing connected with the inlet and configured for connection with a receiving aircraft receptacle, and/or a sensor configured for determining at least one of a ready status, a contact status, and an articulation angle. The sensor may include a ready sensor, a contact sensor, and/or an articulation angle sensor. A method of connecting a fluid nozzle with a receptacle may include providing a fluid nozzle, providing a receptacle, moving the fluid nozzle toward the receptacle, sensing contact between the fluid nozzle and the receptacle via a contact sensor, and/or sensing, via a ready sensor, that the receptacle is latched with the fluid nozzle.

19 Claims, 11 Drawing Sheets

(56) References Cited

U.S. PATENT DOCUMENTS

| | | | |
|---|---|---|---|
| 5,323,118 A * | 6/1994 | Tonogai | G01D 5/2417 |
| | | | 324/660 |
| 7,954,764 B2 | 6/2011 | Ortega De Miguel et al. | |
| 8,720,502 B2 * | 5/2014 | Mouskis | F16L 29/00 |
| | | | 141/382 |
| 9,193,471 B2 * | 11/2015 | Fernandez Garcia | B64D 39/06 |
| 9,840,336 B2 | 12/2017 | Barsheshet et al. | |
| 10,239,631 B2 * | 3/2019 | Lewis | B64D 39/06 |
| 10,279,923 B2 | 5/2019 | Marcos Montes et al. | |
| 2007/0262203 A1 * | 11/2007 | Saggio, III | B64D 39/00 |
| | | | 244/135 A |
| 2013/0161449 A1 * | 6/2013 | Marcos Montes | B64D 39/06 |
| | | | 244/135 A |
| 2016/0311554 A1 * | 10/2016 | Marcos Montes | B64D 39/06 |

\* cited by examiner

FLUID NOZZLE

CROSS-REFERENCE TO RELATED APPLICATION

This application claims the benefit of U.S. Provisional Patent Application Ser. No. 62/675,990, filed on May 24, 2018, the disclosure of which is hereby incorporated herein by reference in its entirety.

TECHNICAL FIELD

The present disclosure generally relates to fluid nozzles, such as an aerial refueling boom nozzles, including fluid nozzles that may be used in connection with aerial refueling of a receiver aircraft by a tanker aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some designs may not be configured to effectively determine whether a nozzle and receptacle are properly connected in a wide variety of configurations, and/or may not be configured to compensate for malfunctioning components.

There is a desire for solutions/options that minimize or eliminate one or more challenges or shortcomings of fluid nozzles. The foregoing discussion is intended only to illustrate examples of the present field and should not be taken as a disavowal of scope.

SUMMARY

In embodiments, a fluid nozzle may include an inlet housing configured for connection with a tanker aircraft boom, an outlet housing connected with the inlet and configured for connection with a receiving aircraft receptacle, and/or a sensor configured for determining at least one of a ready status, a contact status, and an articulation angle. The sensor may include a ready sensor, a contact sensor, and/or an articulation angle sensor.

With embodiments, a method of connecting a fluid nozzle with a receptacle may include providing a fluid nozzle, providing a receptacle, moving the fluid nozzle toward the receptacle, sensing contact between the fluid nozzle and the receptacle via a contact sensor, and/or sensing, via a ready sensor, that the receptacle is latched with the fluid nozzle. The contact sensor may include a magnetic sensor and a magnet. The magnet may be connected to a poppet of the fluid nozzle. Sensing contact between the fluid nozzle and the receptacle may include moving the magnet toward the magnetic sensor. The ready sensor may include a switch and a latch indication trigger. Sensing that the receptacle is latched with the fluid nozzle may include a latch roller of the receptacle engaging the latch indication trigger to cause rotation of the latch indication trigger. The method may include sensing an articulation of the fluid nozzle via an articulation sensor. The articulation sensor may include a magnetic sensor connected/fixed to the inlet housing of the nozzle and a magnet connected to an outlet housing of the nozzle or to a ball joint pedestal of the inlet housing.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In some cases, an aerial refueling tanker boom operator may rely only on visual cues to estimate the articulation angle of a ball joint of a fluid nozzle. A fluid nozzle may have a limited amount of articulation and exceeding this limit can cause damage to one or both of the tanking aircraft and the receiving aircraft. Additionally, an excessive articulation angle while attempting to disconnect the tanking aircraft from the receiving aircraft may be an indication that the fluid nozzle is stuck in the receptacle.

Figure 1:
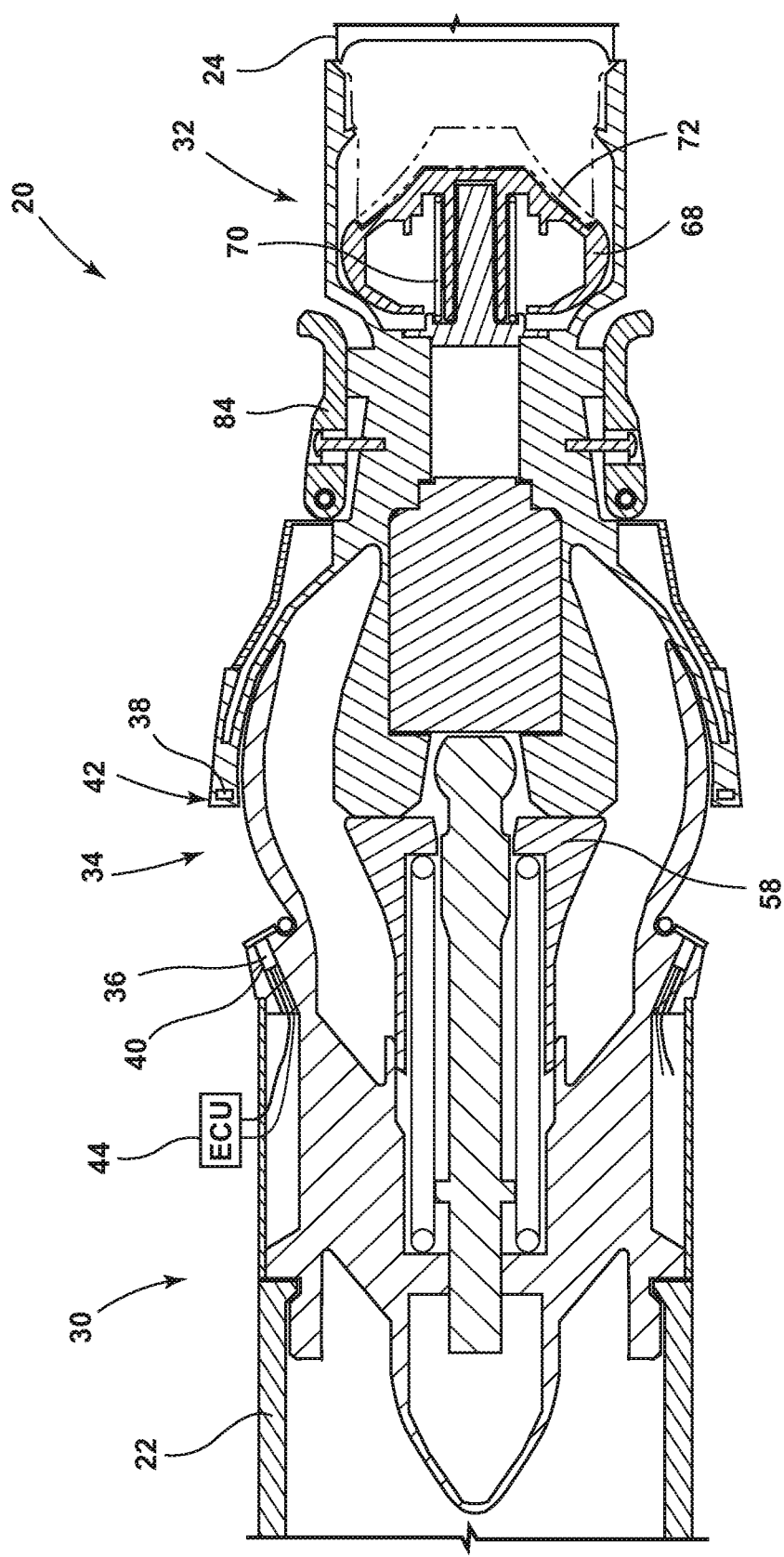
FIGS. 1-3 are cross-sectional views generally illustrating an embodiment of a fluid nozzle with an articulation angle sensor according to teachings of the present disclosure.
Figure 2:
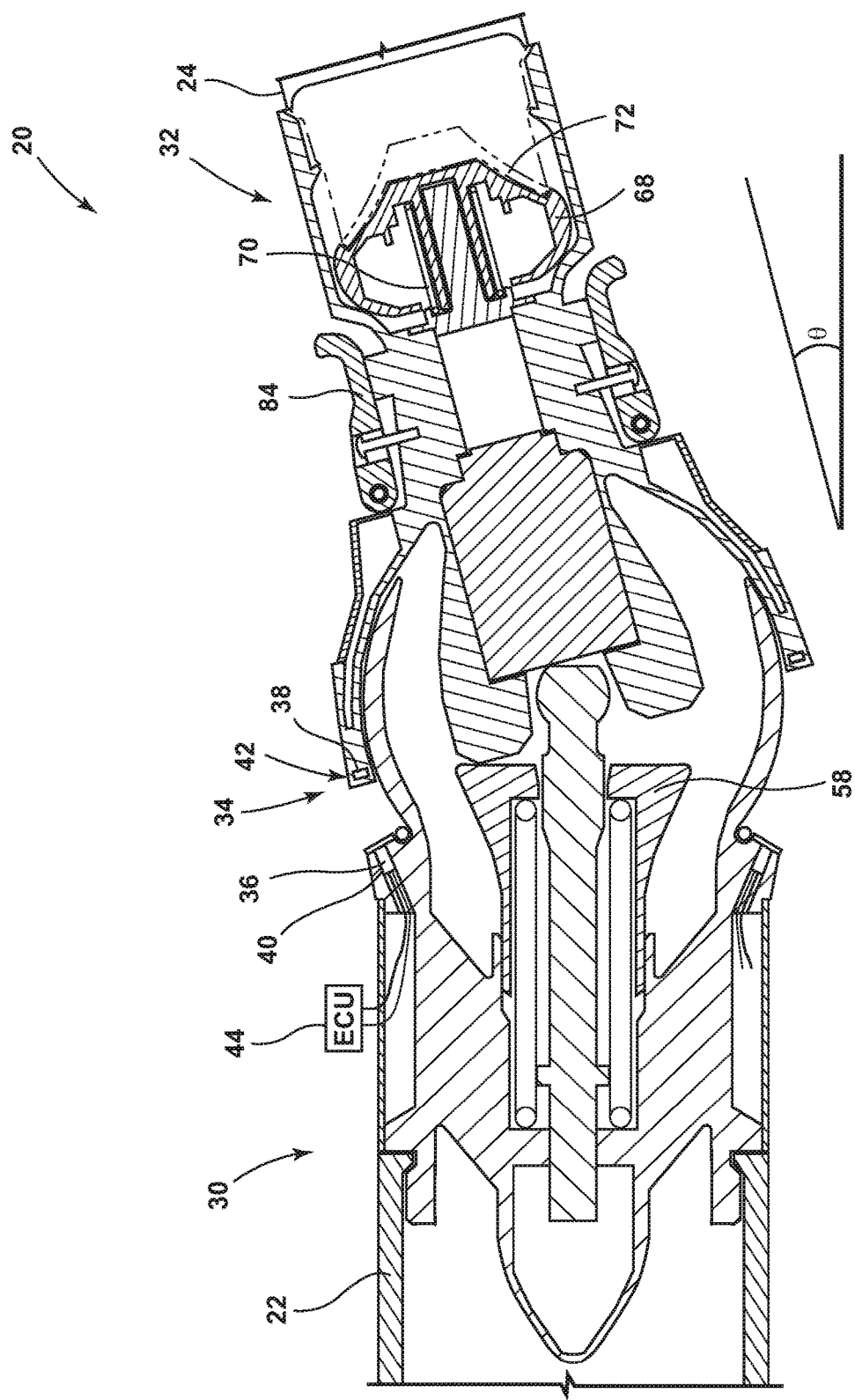
Figure 3:
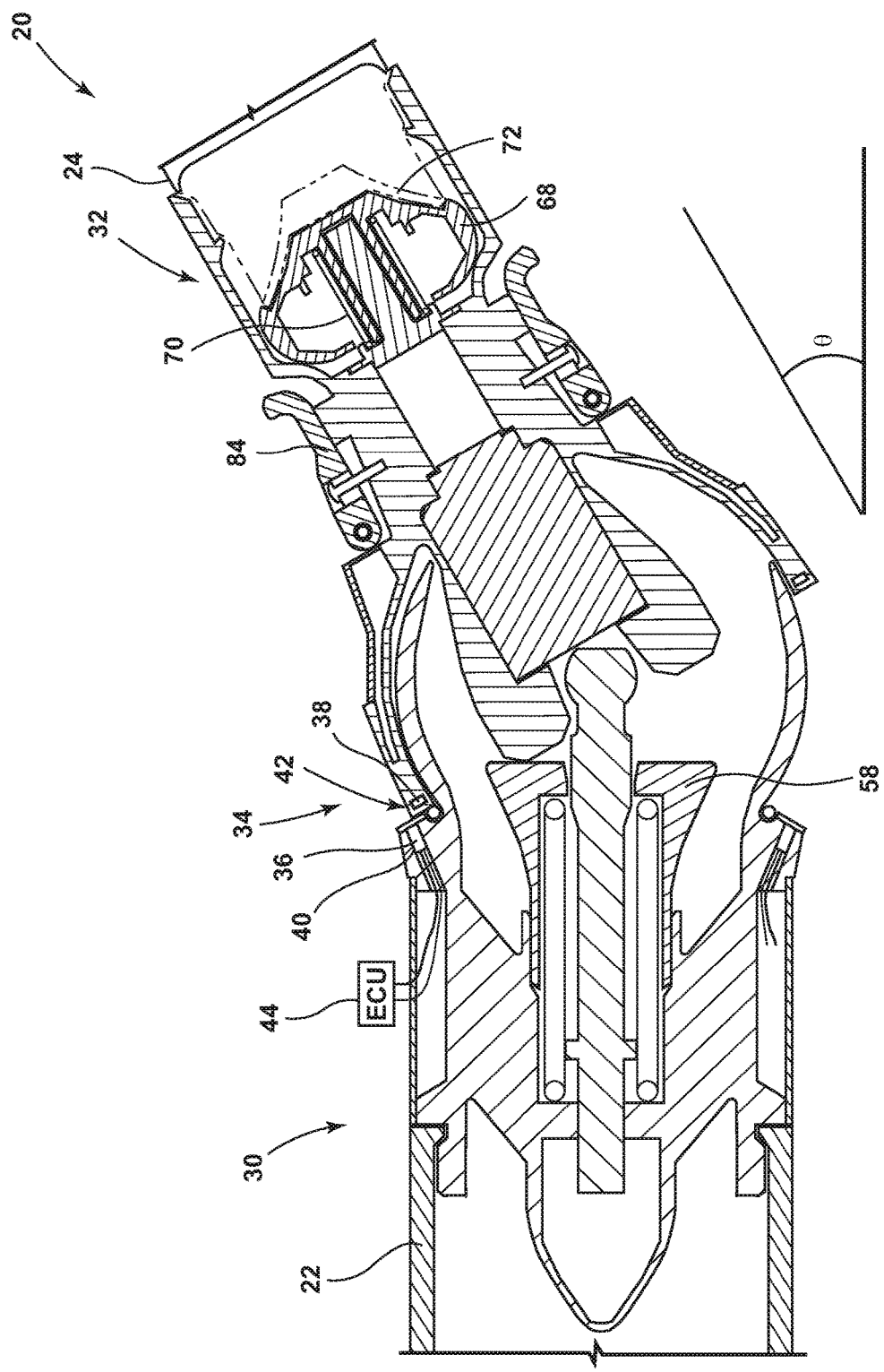

In embodiments, such as generally illustrated in FIGS. 1-3, a fluid nozzle 20 (e.g., a boom nozzle) may be configured to connect a first fluid conduit 22 (e.g., a boom of a tanker aircraft) with a second fluid conduit 24 (e.g., a receptacle of a receiving aircraft). A fluid nozzle 20 may include an inlet housing 30 and an outlet housing 32. The inlet housing 30 may be configured for connection with the first fluid conduit 22. The outlet housing 32 may be configured for connection with the second fluid conduit 24. The outlet housing 32 may be configured to articulate relative to the inlet housing 30. For example and without limitation, the inlet housing 30 and the outlet housing 32 may be connected via a ball joint arrangement. The inlet housing 30 of the fluid nozzle 20 may be fixed to the first fluid conduit 22 (e.g., a tanker aircraft boom) and the outlet housing 32 of the fluid nozzle 20 may be free until inserted into/connected with the second fluid conduit 24 (e.g., the receiver aircraft receptacle).

With embodiments, a fluid nozzle 20 may include one or more articulation angle sensors 34 in multiple planes that may provide information about an angle of the outlet housing 32 relative to the inlet housing 30. An articulation sensor 34 may include a magnetic sensor 36 (e.g., a Hall Effect sensor) and a magnet 38 (e.g., a permanent ring magnet). The magnetic sensor 36 may be disposed in a dry portion 40 of the inlet housing 30 and may be arranged or oriented such that the magnetic sensor 36 may detect the magnet 38, which may be disposed or installed on or about an edge of the outlet housing ball joint interface 42 (see, e.g., FIGS. 1-3). For example and without limitation, the magnetic sensor 36 may be disposed adjacent an outer surface of the inlet housing 30 and the magnet 38 may be disposed adjacent an outer surface of the outlet housing 32. The magnetic sensor(s) 36 may be directed toward the outlet housing 32 and/or may be disposed at an acute angle relative to an axial direction. As the outlet housing 32 articulates relative to the inlet housing 30, the magnetic sensor(s) 36 may detect a change in magnetic field resulting from the movement of the magnet 38 with the outlet housing 32, and the magnetic sensor(s) 36 may provide associated information to the tanker aircraft. This information may then be translated (e.g., by an electronic control unit or ECU 44 of the tanker aircraft) into angles of articulation for each of one or more planes of movement, which may be translated collectively or independently.

Figure 4:
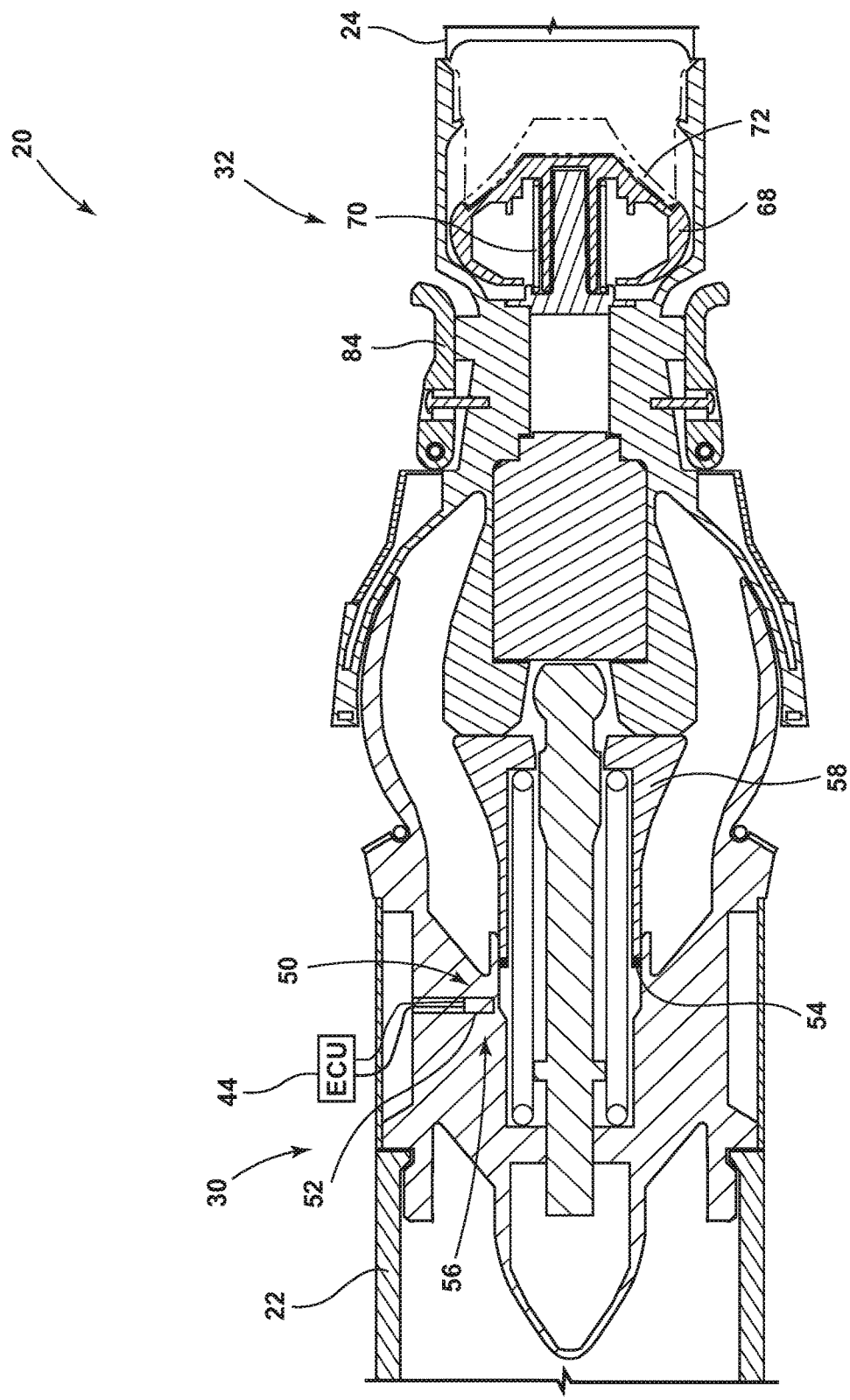
FIGS. 4-6 are cross-sectional views generally illustrating an embodiment of a fluid nozzle with an articulation angle sensor according to teachings of the present disclosure.
Figure 5:
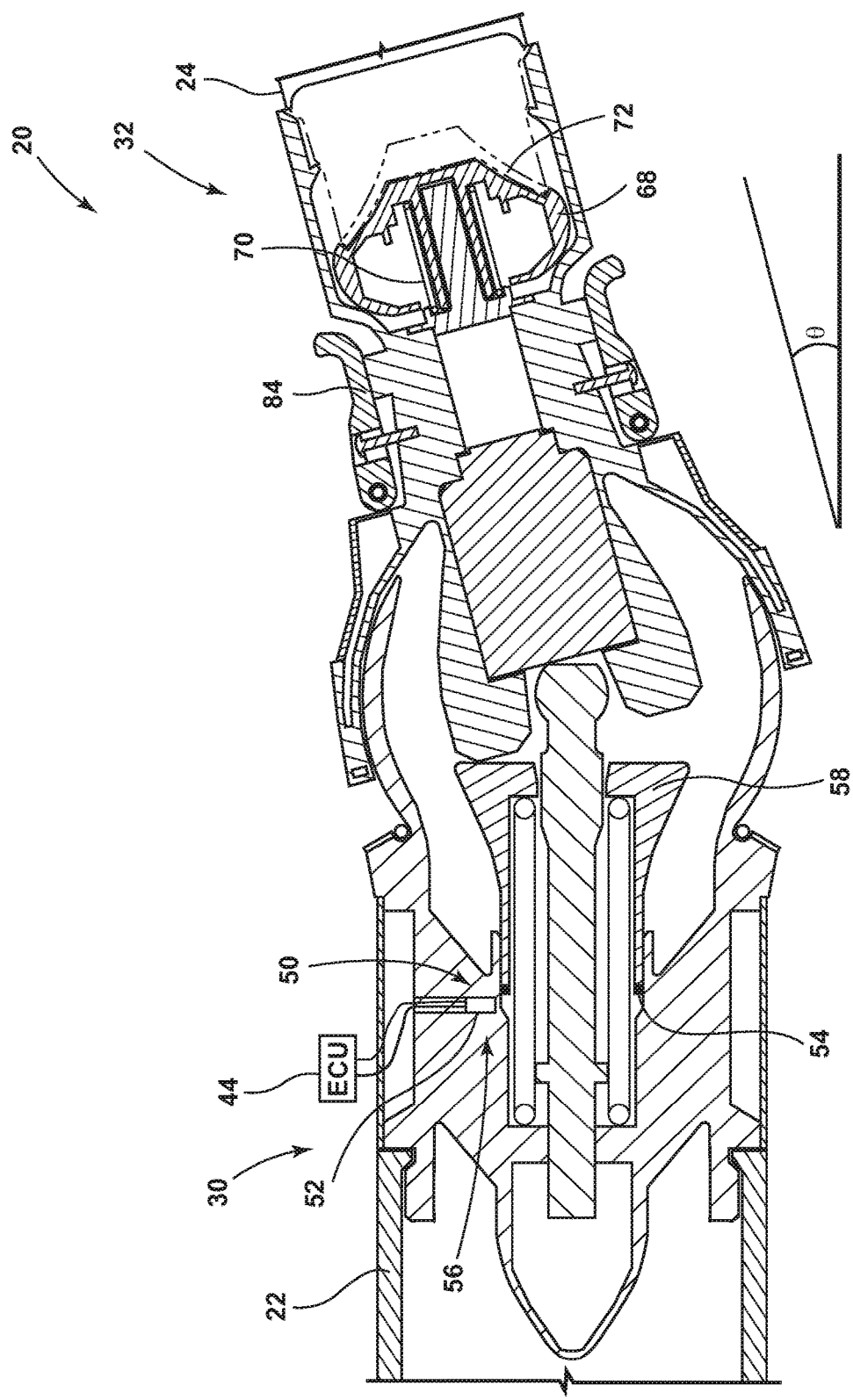
Figure 6:
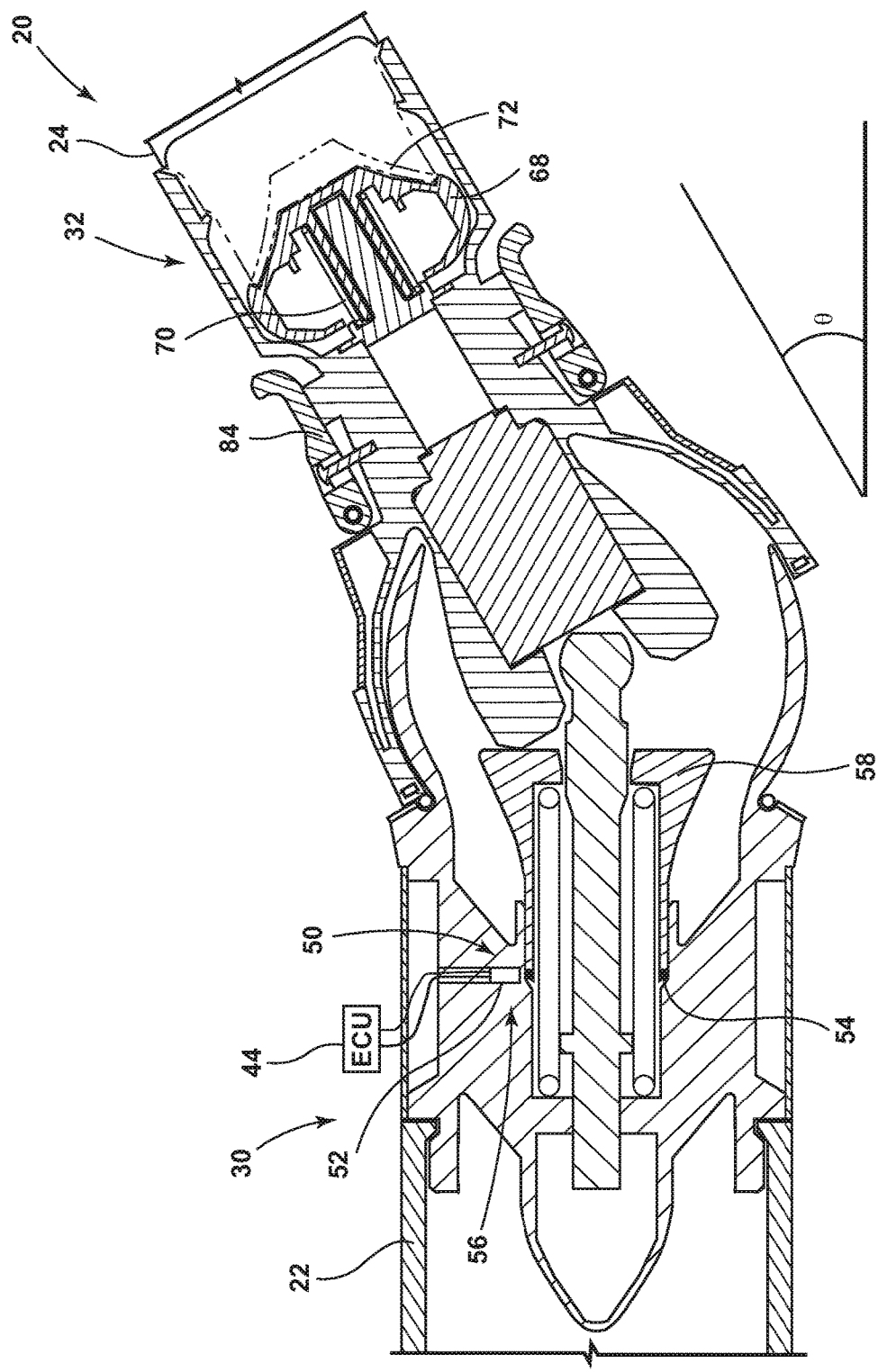

In embodiments, such as generally illustrated in FIGS. 4-6, an articulation sensor 50 of a fluid nozzle 20 may include one or more magnetic sensors 52 (e.g., Hall Effect sensors or proximity switches) and/or one or more magnets 54 (e.g., permanent ring magnets). A magnetic sensor 52 may be disposed in a dry portion 56 of the inlet housing 30 and may be oriented such that the magnetic sensor 52 may sense or detect a magnet 54 that may be disposed on or about an edge of a ball joint pedestal 58. The magnetic sensor 52 may, for example and without limitation, be substantially aligned with a radial direction and/or may be directed radially inward. The ball joint pedestal 58 may be slidably connected with the inlet housing 30. Any articulation angle, regardless of plane, may cause the ball joint pedestal 58 to translate linearly. As the outlet housing 32 articulates relative to the inlet housing 30, the magnetic sensor(s) 52 may detect a change in magnetic field due to the magnet 54 traveling with the ball joint pedestal 58 closer to (or farther from) the sensor(s) 52. The sensor 52 may provide this information to the tanker aircraft. This information may then be translated into an articulation angle (e.g., by an electronic control unit or ECU 44 of the tanker aircraft).

An aerial refueling tanker may, for example, rely on "Contact" and "Ready" sensors in a receiver aircraft boom nozzle receptacle to confirm or determine that the nozzle and receptacle are properly connected and that it is safe to begin transferring fluid/fuel. An issue may arise if the receptacle sensors are not operating and/or or if a bad voice coil in the receptacle or nozzle prevents the signal from the receiver from properly reaching a tanker. When this happens, an operator of a tanker may determine visually whether the nozzle and receptacle are connected and advance the "Contact" and "Ready" signals manually. In some instances, the nozzle and receptacle may appear visually to be connected, but may not actually be sufficiently or adequately connected. If the nozzle and receptacle are not sufficiently or adequately connected, the nozzle may drift out of the receptacle, which may put the nozzle in close proximity to the receiver aircraft where it could, under some circumstances, damage the receiver aircraft, such as if the nozzle and receiver aircraft make contact.

Figure 7:
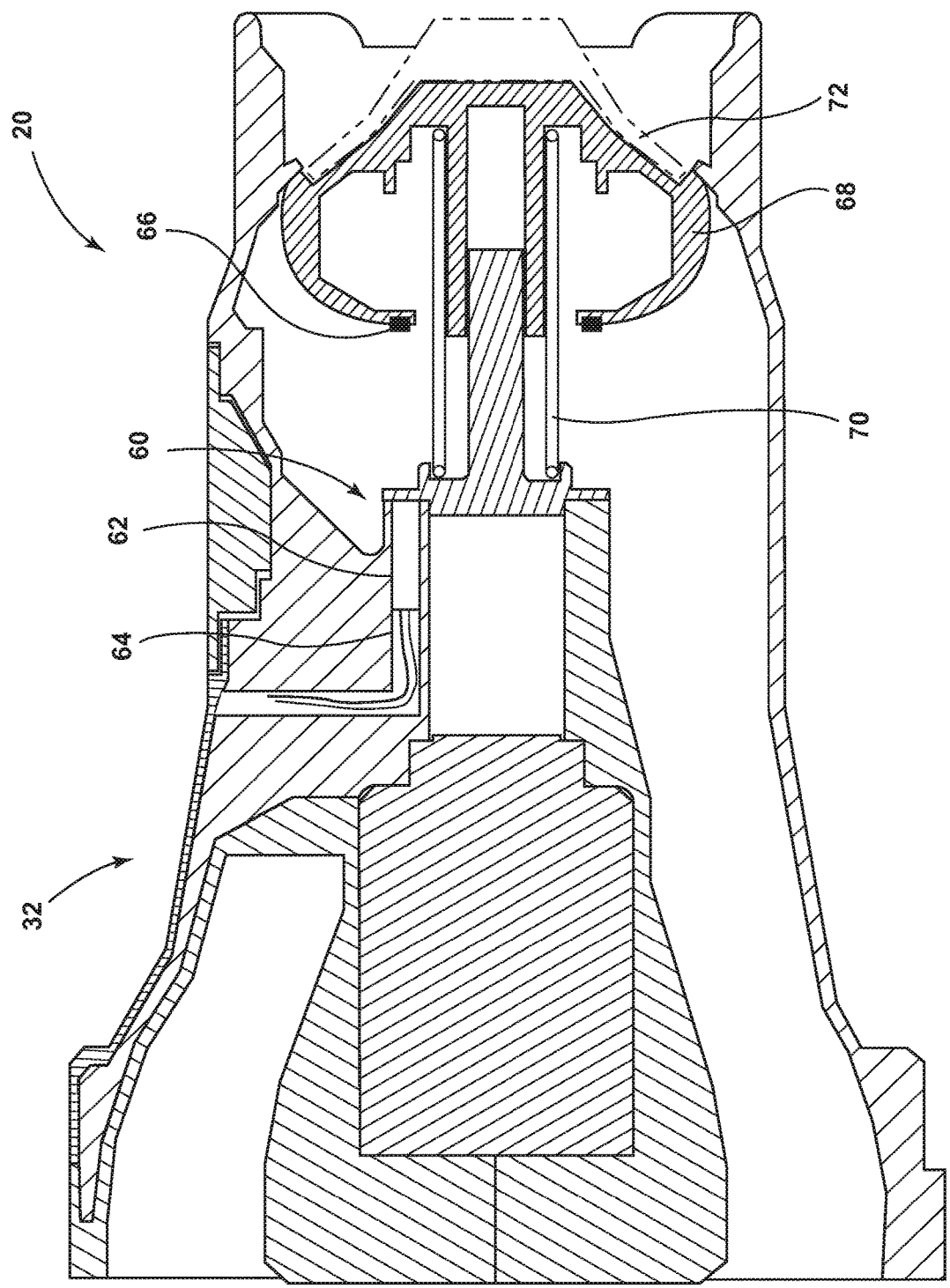
FIGS. 7-9 are cross-sectional views generally illustrating an embodiment of a fluid nozzle with a contact sensor according to teachings of the present disclosure.
Figure 8:
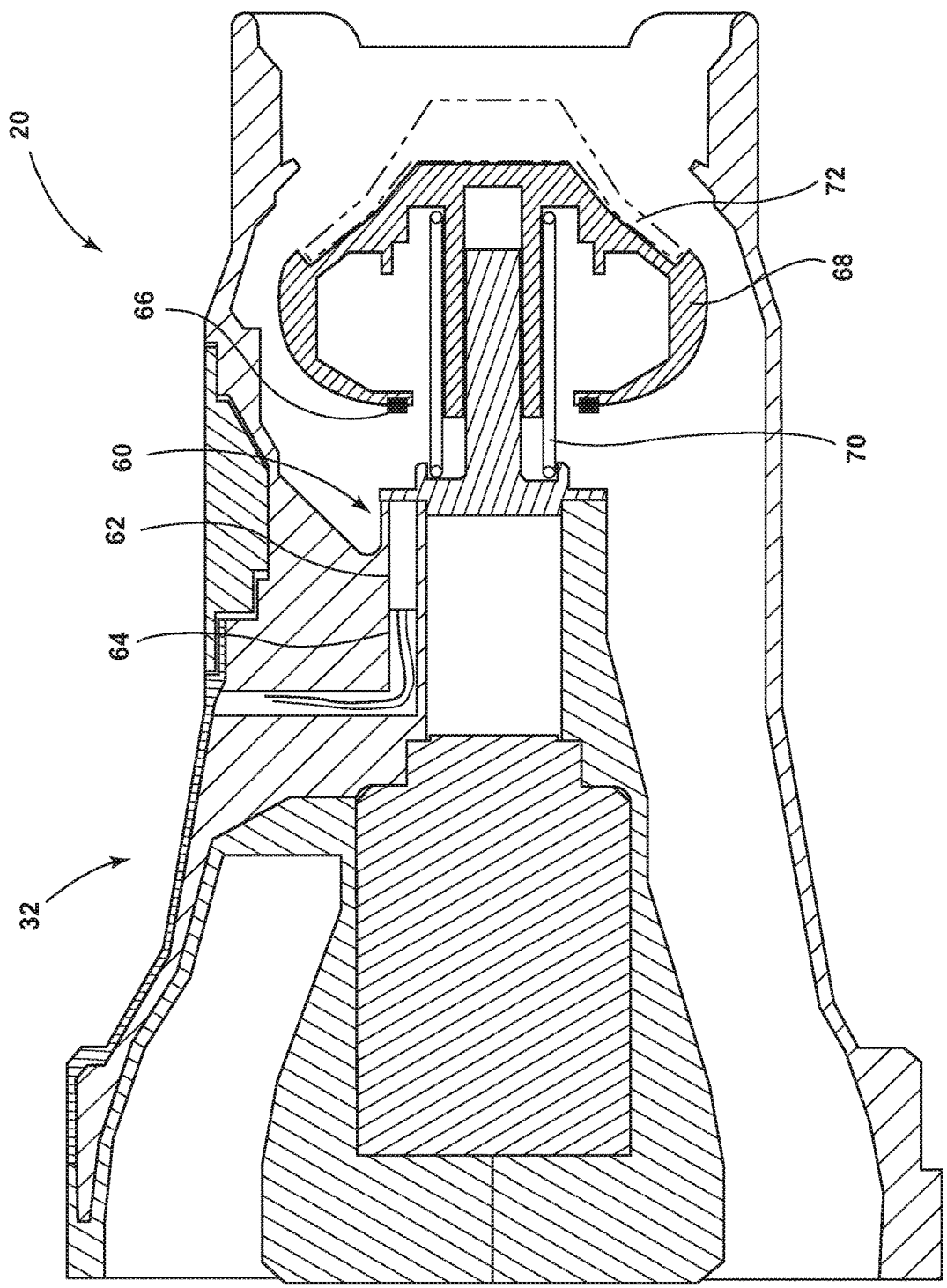
Figure 9:
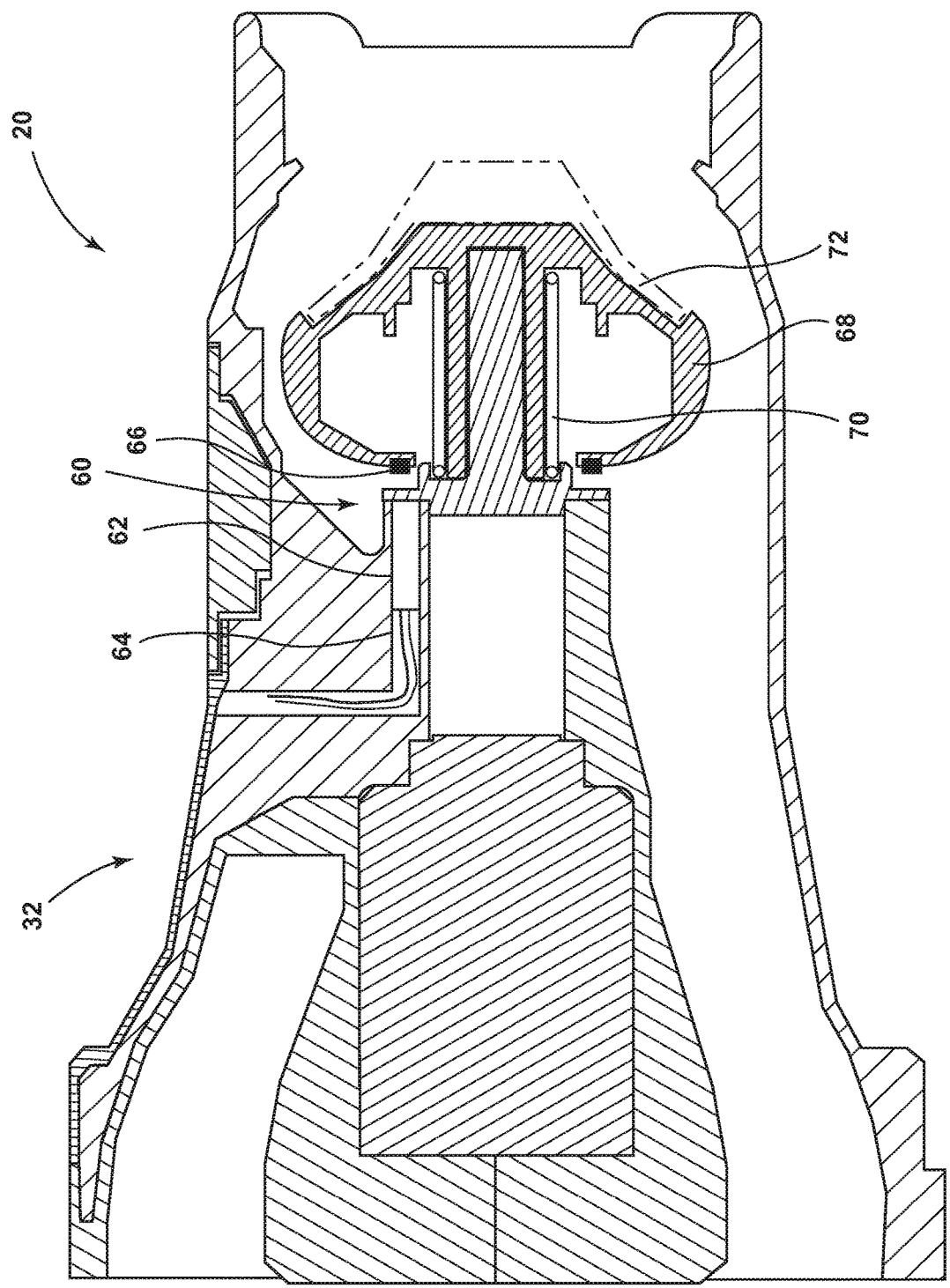

In embodiments, such as generally illustrated in FIGS. 7-9, a fluid nozzle 20, which may be configured as an aerial refueling nozzle or boom nozzle, may include one or more contact sensors 60, which may provide the same or similar "Contact" signals as sensors of a receptacle 24. The one or more contact sensors 60 that may provide "Contact" signals independent of the receiver aircraft receptacle sensors. With such configurations, "Contact" signals may be provided even if the sensors of the receiver aircraft fail to operate and/or or if a bad voice coil prevents the tanker from receiving the signals. An ECU 44 may be configured to determine a contact status of the fluid nozzle 20 according to the "Contact" signal from the one or more contact sensors 60.

With embodiments, a contact sensor 60 may include a switch 62, such as a hermetically sealed proximity switch (e.g., a magnetic or Hall Effect sensor), that may be installed, for example, in a cavity 64 on a dry side of the outlet housing 32. The contact sensor 60 may, for example and without limitation, be substantially aligned with an axial direction and/or may be directed away from the inlet housing 30. In embodiments, the contact sensor 60 may be activated by a magnet 66 (e.g., a permanent magnet) that may be connected to and/or incorporated with a poppet 68 of the fluid nozzle 20. The poppet 68 may translate between open and closed positions to control fluid flow through the fluid nozzle 20. The poppet 68 may be biased toward the closed position by a poppet spring 70.

If the fluid nozzle 20 is inserted into the receiver boom receptacle 24, a pedestal valve 72 of the receptacle 24 may push the poppet 68 of the fluid nozzle 20 open. When the poppet 68 travels a certain travel distance (e.g., a distance between about 0.75 inches and 1.25 includes, such as about 0.84 inches), and beyond, the proximity switch 62 may open or close, depending on the configuration, and may provide a "Contact" signal. The configuration of the proximity switch 62 (e.g., normally open or normally closed) may be dictated by the environment and/or the preference of the boom nozzle operator. When the tanker receives the "Contact" signal, the tanker may know/confirm the receptacle 24 is sufficiently or properly seated in the fluid nozzle 20.

Figure 10:
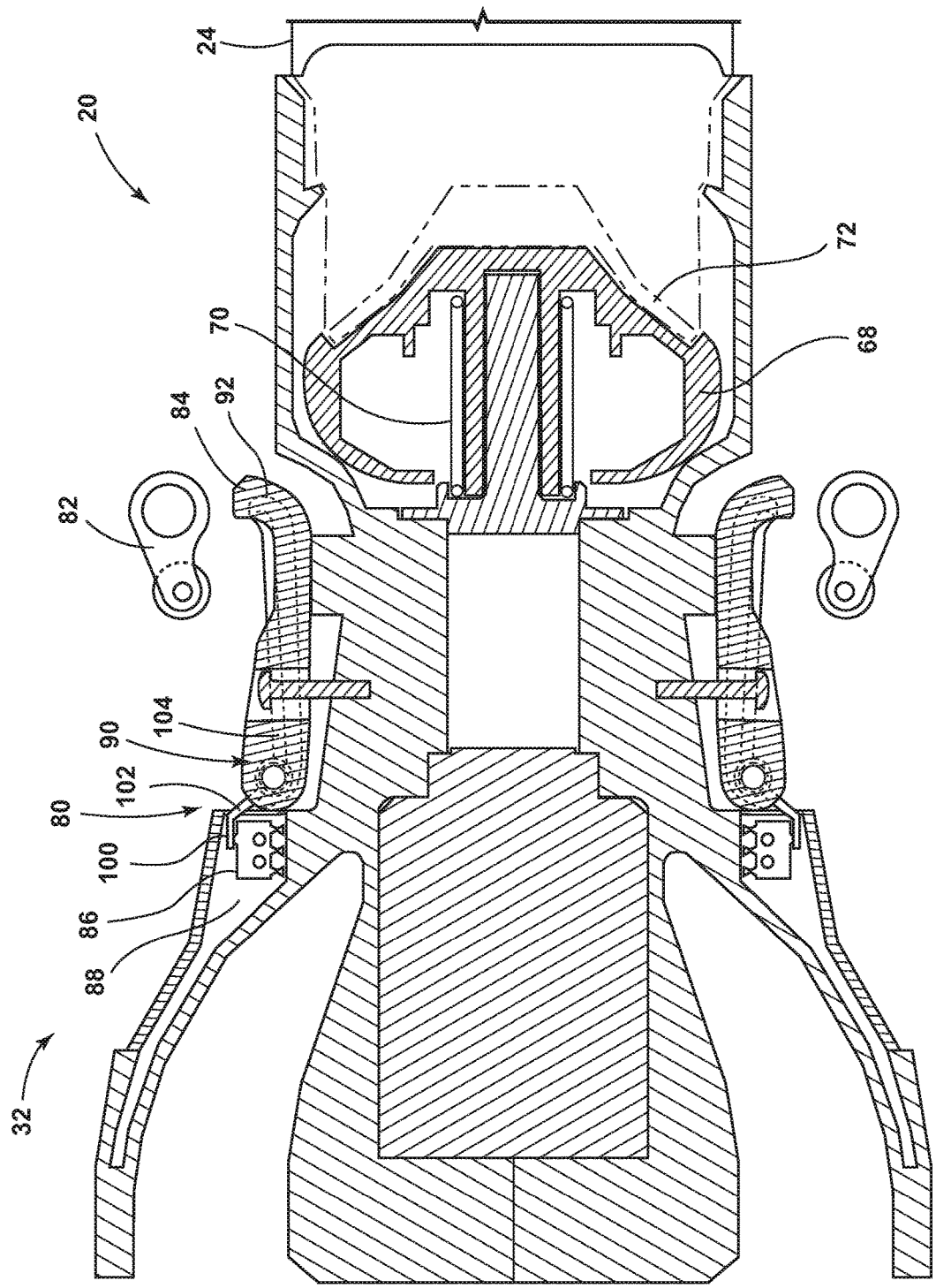
FIGS. 10 and 11 are cross-sectional views generally illustrating an embodiment of a fluid nozzle with a ready sensor according to teachings of the present disclosure.
Figure 11:
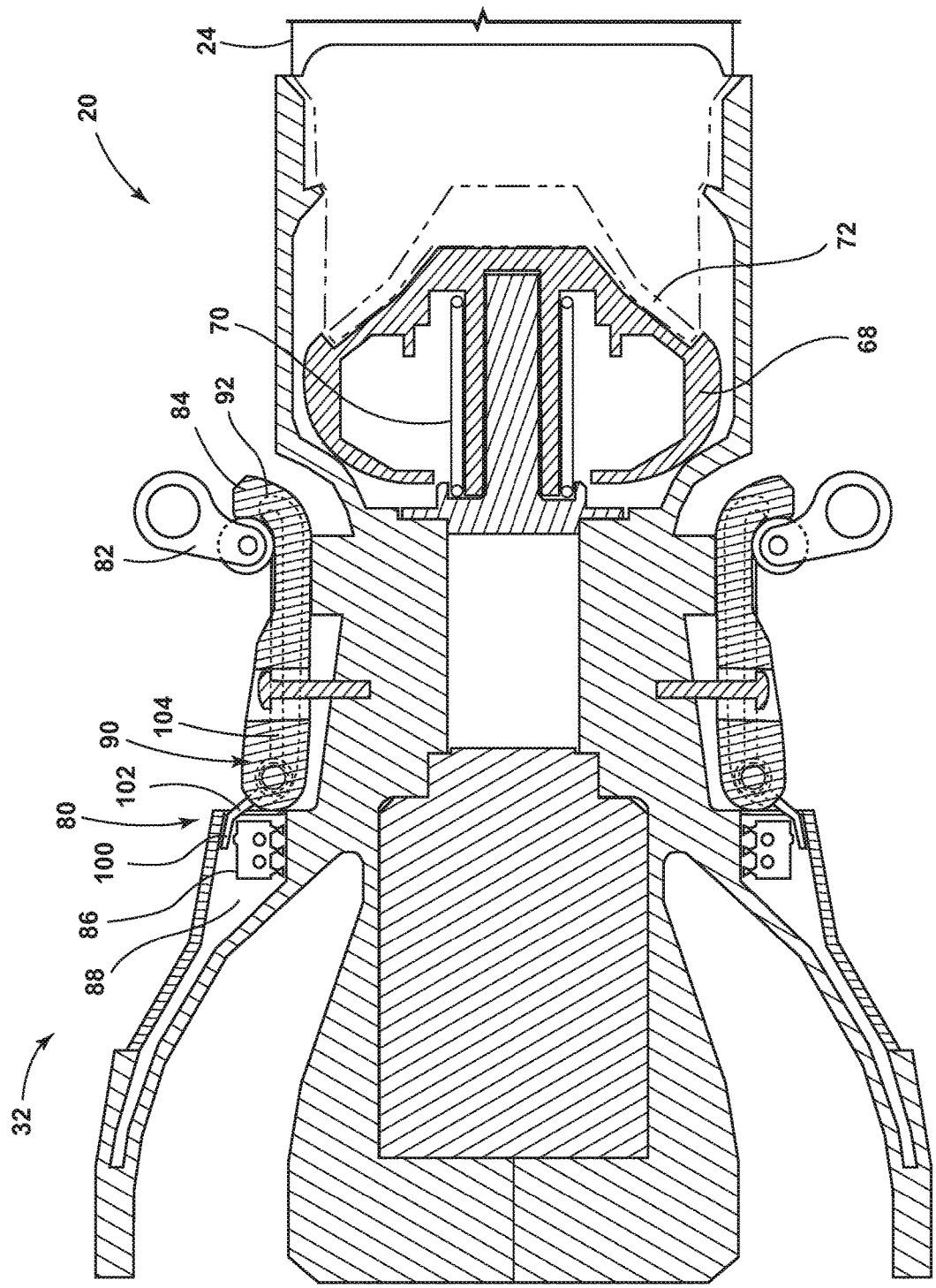

In embodiments, such as generally illustrated in FIGS. 10 and 11, a fluid nozzle 20 may include one or more ready sensors 80 that may provide the same or similar "Ready" signals as the boom nozzle receptacle 24 and may provide greater accuracy of positive engagement of the receptacle rollers 82 in the nozzle latches 84. An ECU 44 may be configured to determine a ready status of the fluid nozzle 20 according to the "Ready" signal from the one or more ready sensors 80. The one or more ready sensors 80 of the fluid nozzle 20 may provide "Ready" signals independent of the receiver aircraft receptacle sensors, so "Ready" signals may be provided even if the sensors of the receiver aircraft fail to operate and/or or if a bad voice coil prevents the tanker from receiving the signals. Embodiments of fluid nozzles 20 may directly sense the positive engagement of the receptacle rollers 82 in the nozzle latches 84 via a ready sensor 80.

With embodiments, such as generally illustrated in FIGS. 10 and 11, a ready sensor 80 may include a switch 86, such as a hermetically sealed switch (e.g., a MicroSwitch), that may be installed in a cavity 88 on the outside of the outlet housing 32. The ready sensor 80 may include a latch indication trigger 90 that may be configured to activate and/or deactivate the switch 86. The latch indication trigger(s) 90 may be hinged and spring-loaded holding a button of the switch 86 down when the receptacle rollers 82 are not fully engaged with the nozzle latches 84. As the receptacle rollers 82 begin to close onto the nozzle latches 84, the receptacle rollers 82 may contact the latch indication trigger(s) 90. The latch indication trigger(s) 90 may be hinged and/or spring-loaded, and the latch indication trigger(s) 90 may move with the receptacle rollers 82 and nest inside a slot 92 in the nozzle latches 84. Once the receptacle rollers 82 fully seat in the nozzle latches 84, the latch indication trigger(s) 90 may release the button(s) on the switch(es) 86.

With embodiments, a latch indication trigger 90 may include one or more of a variety of configurations. For example and without limitation, a latch indication trigger 90 may include a first leg 100, a second leg 102, and/or a third leg 104. The second leg 102 may connect the first leg 100 and the third leg 104, which may be disposed substantially parallel to each other. The third leg 104 may be longer that a combined length of the first leg 100 and the second leg 102. A latch indication trigger 90 may be rotatably connected to a nozzle latch 84. The first leg 100 may be configured to contact and/or activate a switch 86. The third leg 104 may be configured to engage and/or be rotated by a latch roller 82 of the receptacle 24. In an initial position of a latch indication trigger 90, the third leg 104 may extend at least partially radially beyond a nozzle latch 84 and/or may extend outside of a slot 92 (see, e.g., FIG. 10). As the fluid nozzle 20 is connected with the receptacle 24, a latch roller 82 of the receptacle 24 may roll onto a nozzle latch 84 of the fluid nozzle 20 and contact the third leg 104 of a latch indication trigger 90, which may cause rotation of the latch indication trigger 90 toward a second position. In the second position, the latch indication trigger 90 may activate or deactivate a switch 86. In the second position, the third leg 104 may, for example and without limitation, be disposed substantially parallel with an axial direction and/or may be disposed substantially in the slot 92 (see, e.g., FIG. 11).

In embodiments, the switch 86 may be normally open or normally closed, depending on the configuration and/or the preference of the boom nozzle operator. When the tanker (e.g., an ECU 44 associated with the tanker) receives the "Ready" signal, the tanker/ECU 44 may know/confirm the fluid nozzle 20 and receptacle 24 are properly mated and may begin the transfer of fluid/fuel.

In embodiments, a method of connecting a fluid nozzle 20 with a receptacle 24 may include providing a fluid nozzle 20, providing a receptacle 24, moving the fluid nozzle 20 toward the receptacle 24 (which may include sliding the receptacle 24 into the fluid nozzle 20), sensing contact between the fluid nozzle 20 and the receptacle 24 via a contact sensor 60, and/or sensing, via a ready sensor 80, that the receptacle 24 is latched with the fluid nozzle 20. The contact sensor 60 may include a magnetic sensor 62 and a magnet 66. The magnet 66 may be connected to a poppet 68 of the fluid nozzle 20. Sensing contact between the fluid nozzle 20 and the receptacle 24 may include moving the magnet 66 toward the magnetic sensor 62. The ready sensor 80 may include a switch 86 and a latch indication trigger 90. Sensing that the receptacle 24 is latched with the fluid nozzle 20 may include a latch roller 82 of the receptacle 24 engaging the latch indication trigger 90 to cause rotation of the latch indication trigger 90. The method may include sensing an articulation of the fluid nozzle 20 via an articulation sensor 50. The articulation sensor 50 may include a magnetic sensor 52 connected/fixed to the inlet housing 30 and a magnet 54 connected to the outlet housing 32 or to a ball joint pedestal 58 of the inlet housing 30.

Embodiments of nozzles 20 may facilitate automatic and/or autonomous aerial refueling as the refueling process may not involve visual cues to determine a nozzle articulation angle and relative positions of the tanking and receiving aircraft. For example and without limitation, an ECU 44 may automatically determine an articulation angle/position, a contact status, and/or a ready status, such as via one or more articulation sensors 50, one or more contact sensors 60, and/or one or more ready sensors 80. If the ECU 44 determines that the articulation angle is within an acceptable or predetermined range (e.g., about 30 degrees or less), that the one or more contact sensors 60 are providing a contact signal, and/or that the one or more ready sensors 80 are providing a ready signal, the ECU 44 may automatically initiate fueling.

In embodiments, an ECU (e.g., ECU 44) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected, physically and/or electrically, to a display, such as a phone, table, or other touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A fluid nozzle, comprising:
   an inlet housing configured for connection with a tanker aircraft boom; and
   an outlet housing connected with the inlet housing and configured for connection with a receiving aircraft receptacle;
   a sensor configured for determining at least one of a ready status and a contact status; and
   an articulation angle sensor configured for determining an articulation angle between the inlet housing and the outlet housing, the articulation sensor including a magnetic sensor and a magnet, the magnetic sensor being configured to detect a change in a magnetic field resulting from a movement of the magnet;
   wherein the magnetic sensor is disposed in a dry portion of the inlet housing and the magnet is a ring magnet disposed at or about a rear axial portion of the outlet housing.

2. The fluid nozzle of claim 1, wherein the sensor includes a ready sensor and a contact sensor.

3. The fluid nozzle of claim 1, wherein the sensor includes a proximity switch disposed at least partially in a cavity of the outlet housing and is configured for providing a contact signal.

4. The fluid nozzle of claim 3, wherein the proximity switch is hermetically sealed.

5. The fluid nozzle of claim 3, including a poppet disposed in the outlet housing; wherein the sensor includes a magnet fixed to the poppet.

6. The fluid nozzle of claim 1, wherein the sensor includes a switch disposed in a cavity outside of the outlet housing and is configured to provide a ready signal.

7. The fluid nozzle of claim 6, wherein the sensor includes a hinged and spring-loaded latch indication trigger.

8. The fluid nozzle of claim 7, including a nozzle latch; wherein the latch indication trigger is disposed at least partially in the nozzle latch and is configured to rotate relative to the nozzle latch between a first position in which the latch indication trigger activates the switch and a second position in which the latch indication trigger does not activate the switch.

9. The fluid nozzle of claim 8, wherein, in the second position, a leg of the latch indication trigger is disposed substantially parallel to an axial direction.

10. The fluid nozzle of claim 7, wherein the latch indication trigger includes a first leg, a second leg, and a third leg; the first leg is configured to contact the switch; and the third leg is configured to engage a receptacle latch roller.

11. The fluid nozzle of claim 10, wherein the third leg is longer than a combined length of the first leg and the second leg.

12. The fluid nozzle of claim 1, including a ball joint pedestal slidably connected to the inlet housing; wherein the magnet is connected to move with the ball joint pedestal.

13. The fluid nozzle of claim 12, wherein the ball joint pedestal is configured to slide in an axial direction as the outlet housing articulates relative to the inlet housing.

14. A method of connecting a fluid nozzle with a receptacle, comprising:
   providing a fluid nozzle comprising:
      an inlet housing configured for connection with a tanker aircraft boom; and
      an outlet housing connected with the inlet housing and configured for connection with a receiving aircraft receptacle;
      a sensor configured for determining at least one of a ready status and a contact status; and
      an articulation angle sensor configured for determining an articulation angle between the inlet housing and the outlet housing, the articulation sensor including a magnetic sensor and a magnet, the magnetic sensor being configured to detect a change in a magnetic field resulting from a movement of the magnet, the magnetic sensor being disposed in a dry portion of the inlet housing, and the magnet being a ring magnet disposed at or about a rear axial portion of the outlet housing;
   providing a receptacle;
   moving the fluid nozzle toward the receptacle;
   sensing contact between the fluid nozzle and the receptacle via a contact sensor;
   sliding the receptacle into the fluid nozzle; and
   sensing, via a ready sensor, that the receptacle is latched with the fluid nozzle.

15. The method of claim 14, wherein the contact sensor includes a magnetic sensor and a magnet; the magnet is connected to a poppet of the fluid nozzle; and sensing contact between the fluid nozzle and the receptacle includes moving the magnet toward the magnetic sensor.

16. The method of claim 15, wherein the ready sensor includes a switch and a latch indication trigger; and sensing that the receptacle is latched with the fluid nozzle includes a latch of the receptacle engaging the latch indication trigger to cause rotation of the latch indication trigger.

17. The method of claim 14, including sensing an articulation of the fluid nozzle via an articulation sensor.

18. The method of claim 17, wherein the articulation sensor includes a magnetic sensor fixed to the inlet housing of the fluid nozzle and a magnet connected to an outlet housing of the fluid nozzle or to a ball joint pedestal of the inlet housing.

19. A fluid nozzle, comprising:
   an inlet housing configured for connection with a tanker aircraft boom; and
   an outlet housing connected with the inlet housing and configured for connection with a receiving aircraft receptacle;

a sensor configured for determining at least one of a ready status and a contact status;

an articulation angle sensor configured for determining an articulation angle between the inlet housing and the outlet housing, the articulation sensor including a magnetic sensor and a magnet, the magnetic sensor being configured to detect a change in a magnetic field resulting from a movement of the magnet; and a ball joint pedestal slidably connected to the inlet housing; wherein the magnet is connected to move with the ball joint pedestal;

wherein the magnetic sensor is disposed in the inlet housing and the magnet is a ring magnet connected to the ball joint pedestal, wherein a linear displacement of the ball joint pedestal indicates that the outlet housing is articulated.

* * * * *